United States Patent
Kornylak

[11] 3,724,646
[45] Apr. 3, 1973

[54] ENDLESS BELT CONVEYOR
[75] Inventor: Andrew T. Kornylak, Hamilton, Ohio
[73] Assignee: Kornylak Corporation, Hamilton, Ohio
[22] Filed: Feb. 19, 1970
[21] Appl. No.: 12,676

[52] U.S. Cl. ................................................198/201
[51] Int. Cl. ............................................B65g 15/40
[58] Field of Search..............198/204, 184, 191, 201

[56] References Cited

UNITED STATES PATENTS

| | | | |
|---|---|---|---|
| 3,164,245 | 1/1965 | Juengel | 198/204 X |
| 2,523,829 | 9/1950 | Hubbell | 198/204 X |
| 2,948,633 | 8/1960 | Schriner | 198/201 X |
| 3,311,221 | 3/1967 | Burkitt et al. | 198/201 X |

FOREIGN PATENTS OR APPLICATIONS

| | | | |
|---|---|---|---|
| 225,677 | 10/1958 | Australia | 198/201 |

Primary Examiner—Evon C. Blunk
Assistant Examiner—H. S. Lane
Attorney—Jay M. Cantor

[57] ABSTRACT

An endless belt conveyor comprising an open ended elongated tube and a belt having one run supported on the surface of the tube and the return run mounted in the tube. The belt and the surface of the tube are similarly contoured to provide stability for the belt on the tube and to provide for transport of specific loads.

3 Claims, 11 Drawing Figures

PATENTED APR 3 1973 3,724,646

INVENTOR
ANDREW T. KORNYLAK

BY Harold L. Halpert
AGENT

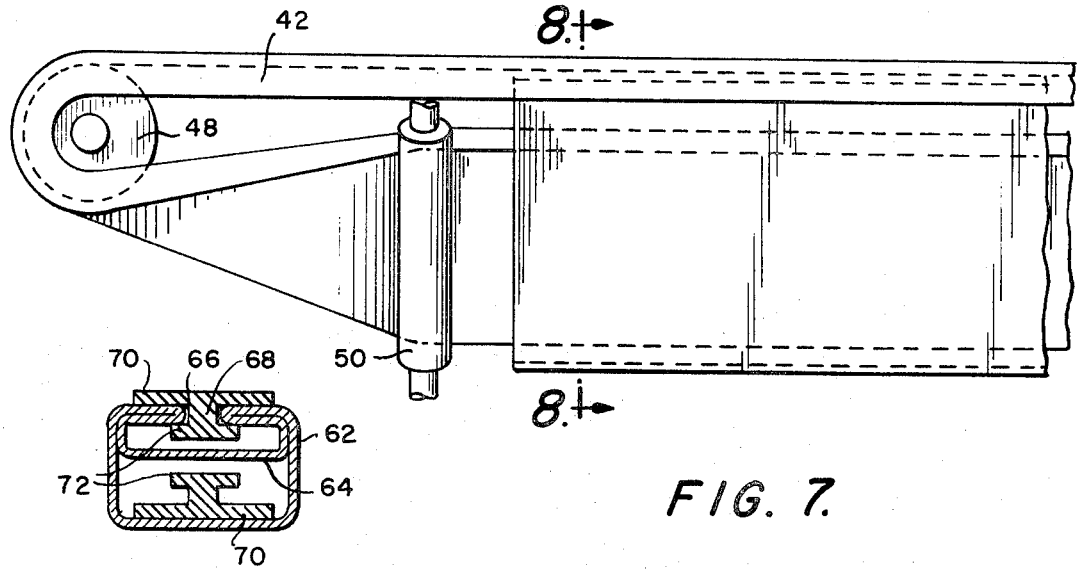
FIG. 7.
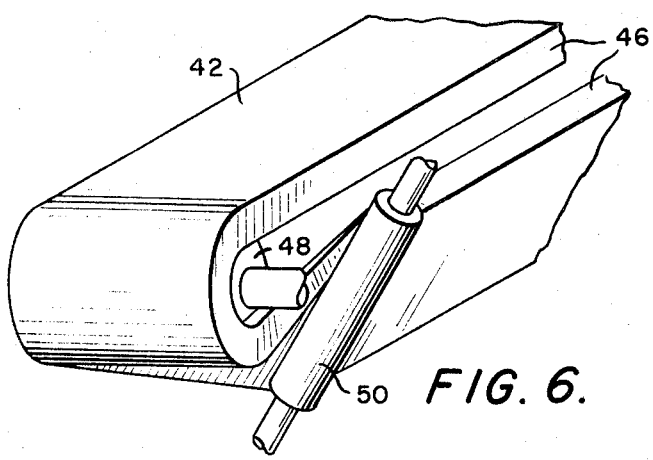
FIG. 6.
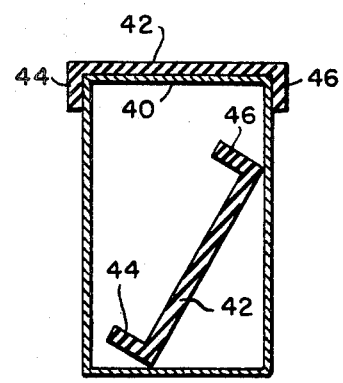
FIG. 8.
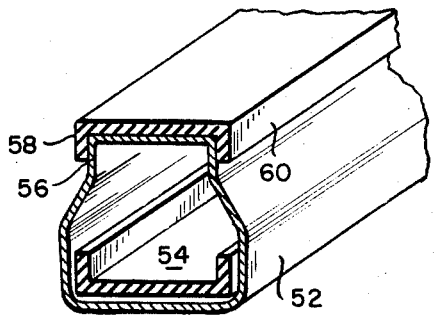
FIG. 9.
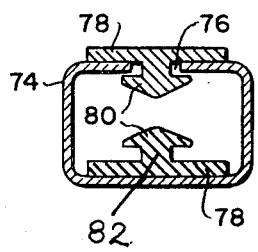
FIG. 11.
FIG. 10.
INVENTOR
ANDREW T. KORNYLAK
BY Harold L. Halpert
AGENT

ENDLESS BELT CONVEYOR

This invention relates to a conveyor and more particularly to an endless belt type conveyor.

The type of conveyor to which this invention relates is disclosed in the British Patent to Juengel, No. 952,489. However, the structure therein disclosed is suitable only for a light load of a specific character and is subject to rapid wear. It is an object of this invention to provide a conveyor which operates on the principle of said British patent but which can convey heavier loads than the patented structure.

It is a further object of this invention to produce a device as aforesaid whereby the belt cannot be easily dislodged from the guided position on top of the tube.

It is a further object to produce a device as aforesaid in which the tube and belt are formed to accommodate various types of loads. It is a further object of this invention to produce a device as aforesaid in which the wear on the sliding parts is held to a minimum.

It is a further object of this invention to produce a device as aforesaid wherein the belt can be easily applied and strongly retained.

These and other objects of the invention will become manifest upon reading the following description in conjunction with the accompanying drawings wherein:

FIG. 6 is a perspective view of one end of another form of the invention,

FIG. 7 is a side elevational view of the conveyor illustrated in FIG. 6,

FIG. 8 is a view taken on the line 8—8 of FIG. 7,

FIG. 9 is a view partly in section of another form of the invention,

FIG. 10 is a section of yet another form of the invention, and

FIG. 11 is a section of another form of the invention.

In accordance with the invention the load supporting surface of the tube and the belt are shaped as mutually conforming surfaces to provide for positive guidance of the load carrying portion of the belt and permitting the use of a variety of shapes for the transport of various articles or materials. The conforming surfaces spread the load over as large an area as is possible and the load per unit area of contact between belt and support is minimal.

Figure 1:
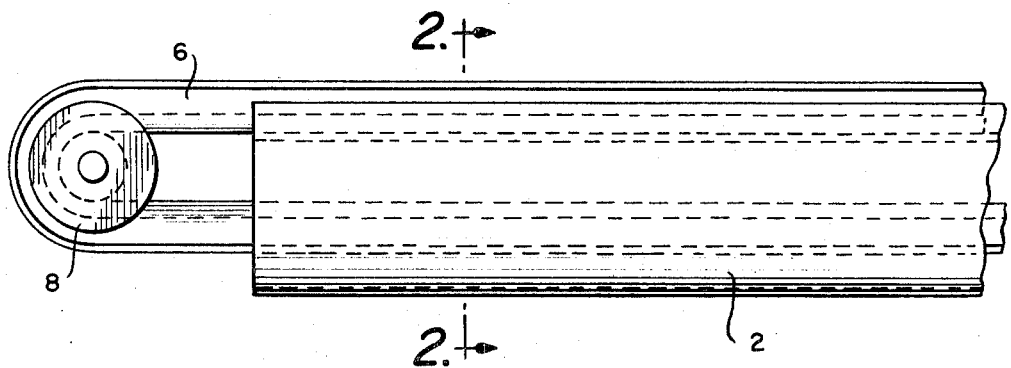
FIG. 1 is a side elevation of an end of one embodiment of the invention.
Figure 2:
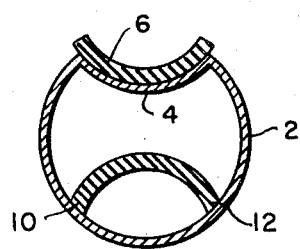
FIG. 2 is a sectional view taken on the line 2—2 of FIG. 1.

With reference to the drawing there is illustrated in FIGS. 1 and 2 an embodiment suited for the transport of small articles or granular material. A tube 2 of circular cross section is formed with a concave depression 4 which forms a guiding and supporting surface for one run of an endless belt 6. The belt is formed with an arcuate cross section congruent to the depression and is trained over a pulley 8 mounted at each end of the tube. One or both pulleys can be driven. The mounting structure for the tube is not illustrated but is such as to support the tube with the depression on top such that granular material will be held on the belt by gravity. The return run of the belt is supported by the edges 10,12 bearing against the inner surface of the tube.

Figure 3:
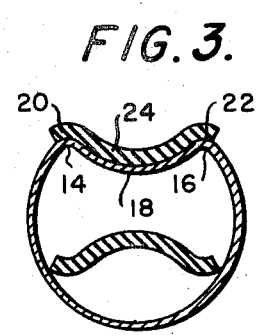
FIGS. 3–5 are sectional views of different embodiments of the invention.

FIG. 3 illustrates a conveyor similar to that disclosed in FIGS. 1 and 2 but is formed with a different shape of cross section. The tube is shaped to provide arcuate sections 14 and 16 connecting the circular section of the tube with the depression 18. The belt is shaped to have edge zones 20,22 congruent to the arcuate sections 14 and 16 and a central zone 24 congruent to the depression. This embodiment has greater stability than the form of the invention disclosed in FIGS. 1 and 2 due to the overlapping of the sections 14,20 and 16,22.

Figure 4:
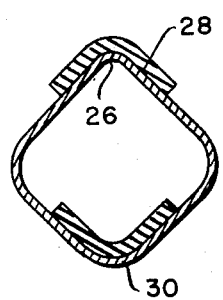

FIG. 4 illustrates another embodiment of the invention wherein a tube of square cross section is supported with a supporting angle portion 26 mounted in the uppermost position. A belt 28 is formed congruent to the angle for carrying a load that can be hooked over the angle. The return run of the belt is carried by the inner wall of the angle portion 30.

Figure 5:
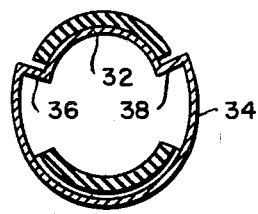

In FIG. 5 is illustrated another form of the invention which can convey a load that has a tendency to twist the belt about the axis of travel. The tube comprises arcuate portions 32,34 interconnected by flat shoulders 37,38. The shoulders operate as stops to limit the twisting of the belt.

In FIGS. 6, 7, and 8 there is illustrated another embodiment of the invention for use in conveying flat bottomed articles. The tube is rectangular and supported with a narrow side 40 in the uppermost position. A belt 42 having a pair of flanges 44 and 46 straddles the tube and forms one run of the belt in the straddling position. The belt is trained over a pair of pulleys 48 mounted at each end of the tube. One or both pulleys can be driven to drive the belt. The width of the belt is greater than the internal dimension of the narrow part of the tube and must therefore be twisted into the position illustrated in FIG. 8 to form the return run. For this purpose a pair of orienting and guiding pulleys 50 are mounted adjacent each end of the tube for twisting and guiding the belt between the horizontal and skewed orientation. While the belt is illustrated as being supported by the small end of the rectangular section it is obvious that this arrangement can be used with the large dimension of the section as the supporting surface.

In FIG. 9 there is illustrated a tube having a modified rectangular section which avoids the necessity of twisting the belt as described with reference to FIGS. 6–8 but requires a more complex cross section. In this form of the invention the belt supporting segment of the tube for the return run is bulged outwardly as indicated at 52 and is congruent to the outer surface of the belt 54. The belt straddles the upper portion of the tube 56 and is guided by flanges 58 and 60. The driving and supporting pulleys are similar to pulleys 8 and are not illustrated.

In FIG. 10 there is illustrated a tube 62 having a rectangular section shaped to provide a reinforcing wall 64 to provide added strength and a slot 66 for reception of a web 68 of the belt. The belt is formed with a load carrying flange 70 and a keeper flange 72 to retain the belt on the top surface of the tube under conditions of great vibration on opposite ends of web 68. The belt is threaded into position and then spliced.

FIG. 11 discloses a tube 74 provided with a slot 76. The belt is formed with a load carrying flange 78 and a keeper flange 80 on opposite ends of a web 82. In this form of the invention the belt is spliced and the keeper flange forced through the slot.

In all forms of the invention it is preferred to use steel as the material for the tube and either Nylon or polypropylene as the principle material for the belt. For example, the belt could be made of Nylon with glass fabric reinforcement for tensile strength. However, other materials can be used within the spirit of the invention.

I claim:

1. A conveyor comprising an elongated support having a surface and an endless belt of uniform cross-section having a run thereof in contact with said surface of the support for movement along its length, the belt being preformed into a concave form in cross-section, the surface of the support conforming to the preformed shape of the belt and cooperating therewith to minimize lateral movement of the belt relative to said surface, the belt being preformed to be concave upwardly on the support and to have its marginal edge portions turned downwardly on said support.

2. A conveyor according to claim 1 wherein the belt is of concavo-convex form.

3. A conveyor according to claim 2 wherein the support is tubular in cross-section, the return run of the belt being located within the support.

* * * * *